United States Patent [19]
Vereschagin et al.

[11] Patent Number: 5,916,955
[45] Date of Patent: *Jun. 29, 1999

[54] DIAMOND-CARBON MATERIAL AND METHOD FOR PRODUCING THEREOF

[75] Inventors: Alexandr Leonidovich Vereschagin; Evgeny Anatolievich Petrov; Gennady Viktorovich Sakovich; Vitaly Fedorovich Komarov; Anatoly Valentinovich Klimov; Nikolai Vladimirovich Kozyrev, all of Biisk, Russian Federation

[73] Assignee: Federalny Nauchno-Proizvodstvenny Tsentr Altai, Russian Federation

[*] Notice: This patent is subject to a terminal disclaimer.

[21] Appl. No.: 08/772,247

[22] Filed: Dec. 23, 1996

Related U.S. Application Data

[63] Continuation of application No. 08/318,685, filed as application No. PCT/RU94/00014, Feb. 1, 1994.

[30] Foreign Application Priority Data

Feb. 12, 1993 [RU] Russian Federation ............. 93003669

[51] Int. Cl.$^6$ ....................................................... B01J 3/06
[52] U.S. Cl. .............................. 524/495; 423/446; 501/86
[58] Field of Search .............................. 423/446; 501/86; 428/408; 264/84; 252/29; 524/495, 496; 526/255

[56] References Cited

U.S. PATENT DOCUMENTS

| | | | |
|---|---|---|---|
| 3,883,452 | 5/1975 | Scheuerlein et al. | 51/298 |
| 4,483,836 | 11/1984 | Adadurov et al. | 423/446 |
| 5,482,695 | 1/1996 | Guschin et al. | 423/446 |

FOREIGN PATENT DOCUMENTS

| | | |
|---|---|---|
| 072655 | 3/1990 | Japan . |
| 1154633 | 6/1969 | United Kingdom . |

OTHER PUBLICATIONS

Japanese Publication JP–072655 With English Abstract
Properties Of . . . Synthesis: A.L. Vereschagin et al: 1993: pp. 160–162 no month.
Soot Derived. . . Charge: vol. 22: No. 2, pp. 189–191, 1984 no month.
Nature: Diamonds in. . . Soot: N. Roy Greiner et al: vol. 333 Jun. 2, 1988: pp. 22–25.
Journal of Applied Physics: Vol. 62: Sep. 1, 1987: pp. 1553–2159: Mathias Van Thiel et al.
Diamond & Related Materials: vol. 1, No. 1, Aug. 15, 1991: pp. 3–7B.
The Journal of Organic Chemistry: vol. 50: Dec. 27, 1985: No. 26: pp. 8–9A.

*Primary Examiner*—Michael Lewis
*Assistant Examiner*—Stuart L. Hendrickson
*Attorney, Agent, or Firm*—Ladas & Parry

[57] ABSTRACT

The present invention relates to a diamond-carbon material, containing carbon, hydrogen, nitrogen, oxygen and incombustible impurities of a composition specified in the disclosure, and the surface contains methyl, carboxyl, lactone, aldehyde, ether and quinone groups.

The material of the present invention is produced by detonating an oxygen-deficient explosive in a closed volume in a medium inert towards carbon, at a cooling rate of the detonation products of 200 to 6000 degree/min.

11 Claims, No Drawings

DIAMOND-CARBON MATERIAL AND METHOD FOR PRODUCING THEREOF

This application is a continuation of application Ser. No. 08/318,685 filed on Jan. 31, 1995 now abandoned. International Application PCT/RU94/00014 filed on Feb. 1, 1994 and which designated the U.S.

The present invention relates to the chemistry of carbon, and more specifically, to a diamond-carbon material containing carbon of a cubic modification, a roentgen-amorphous phase of carbon and a crystalline carbon phase, and to a method for producing thereof.

In detonating a carbon-bearing oxygen-deficient explosive under the conditions permitting of preserving condensed carbon explosion products, there are produced ultradispersed carbon-bearing powders featuring specific properties, such as a high reactivity, and a supersmall size of particles with highly defective carbon structures formed. It is just the range of these properties that defines the sphere of their practical application in composite materials as a modifying agent.

The properties of carbon-bearing materials produced by using the power of explosion are known from a number of publications.

In one publication/Yokan Nomura & Kazuro Kawamura Carbon, vol. 22, No.2, pp.189–191 (1984)/, there are described some properties of soot produced in detonation of trinitrotoluene in an apparatus made from carbon steel. (The composition of the atmosphere is not reported). From the data of electron microscopy, this specimen mainly comprises a roentgen-amorphous phase of nondiamond carbon constituted by particles of 5 to 10 nonflat carbon layers distributed chaotically so that no graphite phase is produced. Radiographic studies have shown the presence of only strongly broadened reflection (002) of carbon. The carbon particles have a nonspherical shape, as distinct from the particles of soot formed in the combustion processes.

Another publication of theoretical investigations/Van Thiel, M. & Rec., F. H. J. Appl.Phys., vol. 62, pp. 1761–1767 (1987)/considers some properties of carbon formed in detonation of trinitrotoluene. On the basis of calculation, the authors have made the assumption that the carbon formed under these conditions features excessive energy as against graphite by 1 to 2 kcal/mol. Proceeding from these data the assumption has been made that the carbon particles produced in explosion must have the size of the order of 10 nm.

Taken as the closest prior art (prototype) is the work [N. Roy Greiner, D. S. Phillips, J. D. Johnson & Fred Volk Nature vol. 333, 2nd. June 1988, pp.440–442], which discloses some properties of carbon from the products of detonation of an explosive made up of trinitrotoluene and RDX of the composition 60/40% by means in the atmosphere of argon at atmospheric temperature. From these data, the condensed products of explosion comprise carbon of diamond and nondiamond modifications.

The crystalline and roentgen-amorphous carbon phases are made up of compact spheroids of a diameter of some 7 nm and bent bands around 4 nm thick. The nondiamond form of carbon is characterized on the X-ray pattern by an inter-plane spacing of 0.35 nm typical of reflection (002) for the fully amorphous and randomly disoriented graphite.

The diamond carbon phase compact spheroids of a diameter of some 7 nm. In the studies by the method of electron diffraction, the following set of inter-plane reflections has been recorded: d=0.2058, 0.1266, 0.1075, 0.884, 0 and 0.636 nm which correspond to the reflection planes (111), (220), (311), (400) and (440) of the diamond.

Not a single of the prior-art materials described above has found industrial application.

The invention is based on the technical problem of providing a diamond-carbon material with a combination of properties making it suitable for use as a component of composite materials with improved characteristics and a method for producing thereof.

This object is accomplished by the provision of a diamond-carbon material comprising, according to the invention, carbon, hydrogen, nitrogen and oxygen, % by mass:

carbon of a cubic modification 30 to 75% roentgen-amorphous carbon phase 10 to 15%, and carbon of a crystalline modification the balance with the quantitative ratio of the elements, % by mass:

| | |
|---|---|
| carbon | 84.0 to 89.0 |
| hydrogen | 0.3 to 1.1 |
| nitrogen | 3.1 to 4.3 |
| oxygen | 2.0 to 7.1 |
| incombustible impurities | 2.0 to 5.0 | and the surface contains methyl, carboxyl, lactone, aldehyde, ether and quinone groups.

The product of the claimed invention was produced in detonation of an oxygen-deficient explosive in a closed volume in a medium inert towards carbon which is synthesized at a cooling rate of the detonation products of 200 to 600 degree/min.

Commonly use was made for the purpose of an explosive of the composition: trinitrotoluene/RDX (octogen, analogue of RDX) of 50/50 to 70/30. The material of the invention is a black powder with a unit surface of 218 to 600 $m^2/g$, a specific weight in the range from 2.2 to 2.8 $g/cm^3$ and a humidity of 4.0%. The specific weight of the specimens is defined by the proportion of incombustible impurities, mainly iron. The proportion of incombustible impurities in the product of the invention claimed varies within the limits from 2.0 to 5.0%. The incombustible impurities include magnetite, an alpha-modification of iron and ferric carbide. From data of gamma-resonance spectroscopy, the following distribution of intensities in the spectrum takes place: the contribution of the lines of alpha-iron constitutes 29 to 43%, of magnetite is 36 to 48% and of the ions of ferric iron (represented by ferric carbide) is 16 to 27%. By the elemental composition, the 30 product includes (% by mass) from 84.0 to 89.0 carbon, from 0.3 to 1.1 hydrogen, from 3.1 to 4.3 nitrogen; from 2.0 to 7.1% oxygen (by the difference). (The elemental composition is determined using the standard combustion technique of organic chemistry).

Data of nitrogen and carbon distribution have been obtained using the method of X-ray photoelectron spectroscopy. It was found that the following relationship between the atoms of oxygen and carbon, nitrogen and carbon takes place in the source specimen: O/C=0.030 to 0.040, N/C=0.01 to 0.03. After etching the surface with argon ions these relationships changed: O/C=0.017 to 0.020, N/C=0.001 to 0.0005. This is indicative of the presence of oxygen-and nitrogencontaining groups on the surface of the particles. A low-molecular component of the claimed substance was separated by extraction with nonpolar solvents (tetrachlorated carbon, ether, n-hexane and benzene). The fraction of the total mass varies within the limits 0.36 to 1.13% and is a mixture of organic compounds. From the data of IR-spectroscopy, there was revealed the presence of such functional groups as OH, NH, $CH_2$—, $CH_3$—, CH— and —c—o—c— groups. These compounds are the products of condensation of the stable fragments of molecules in a detonation wave.

Information of the surface condition was obtained making recourse to the methods as follows.

By the data of gas-chromatographic analysis, the following gases are separated when heating in a vacuum at 673K during 2 hours: methane 0.03 to 0.47 cm$^3$/g, hydrogen 0.03 to 0.30 cm$^3$/g, carbon dioxide 0.02 to 0.84 cm$^3$/g, oxygen 0.00 to 0.05 cm$^3$/g and nitrogen 0–20 to 1.83 cm$^3$/g. The total gas separation varies within the limits 0.36 to 2.98 cm$^3$/g.

These data show that the surface of the claimed product includes methyl (because methane is separated) and carboxyl (because separation of $CO_2$ is detected) groups.

On the basis of the data on gas evolution from specimens at the temperatures 573 to 773K, activation energies were determined for a number of gases: 103.6 kJ/mol for carbon monoxide, 23.4 kJ/mol for carbon dioxide, 22.5 kJ/mol for nitrogen and 47.6 kJ/mol for methane. The values of the activation energy obtained point to that the evolved gases are not adsorbed by the surface but are rather formed in breaking of the chemically bonded surface groups.

According to the data of polarographic studies, quinone, lactone, carbonyl, aldehyde and ether groups were present in all specimens. But methyl groups prevail in the product according to the invention, therefore the material features a water-repellent property. This, in turn, defines the sphere of application of the material in composites containing nonpolar components, such as rubbers, polymers, oils. Any chemical treatment materially influences the surface properties of the substance and the possibility of its use in one or another composite material.

Distribution of the carbon forms in the substance of the present invention has been found by using X-ray photoelectron spectroscopy (XPES).

From the data of XPES, C line 1s is represented by a broad asymmetric peak with a halfbreadth of 4.1 eV, which, after being bombarded with argon ions narrows to 2.5 eV and takes the shape typical of graphite or finely dispersed coals. The surface charge is equal to zero, which is characteristic of electrical conductors. It may be assumed that the spectrumen volume is represented by the phase of nondiamond carbon and diamond carbon, the diamond carbon being distributed in particles.

Information on the phase composition of the material of the present invention was obtained using the method of X-ray: phase analysis.

The X-ray patterns of the studied specimens contain, along with three lines relating to the diamond phase of carbon, reflection 002 of carbon and a broad maximum with d=0.418 nm relating to the roentgen-amorphous phase of carbon, the presence of this phase being stipulated by the conditions of synthesis. (The presence of the latter maximum particularly distinctly shows up after partial oxidation of the substance with either air oxygen or an oxidizing mixture of acids).

Distribution of the material particles was found by the method of small-angle scattering. As follows from the curve, size distribution of the particles is characterized by a single maximum in the region between 40 and 50 A. And from these data the carbon phases are not divided by particle sizes.

Investigation into the behavior of specimens heated in the air atmosphere showed that one broad exoeffect with a maximum at 683 to 773K is observed on a DTA curve, which is indicative of a very high homogeneity of the material. It is not found possible to separate the material into nondiamond and diamond forms of carbon without destroying one of them.

On the basis of the conducted investigations, the following particle structure of the material according to the invention can be assumed. A diamond nucleus in the center is surrounded by the roentgen-amorphous phase of carbon. The roentgen-amorphous carbon phase in contact with the nucleus comprises a roentgen-amorphous phase of diamond which passes through the roentgen-amorphous carbon phase into a crystalline phase of carbon. Surface groups are found on the surface of the crystalline carbon phase.

The diamond-carbon material of the present invention is produced by detonating an oxygen-deficient explosive in a closed volume in a medium inert towards carbon at a cooling rate of the detonation products of 200 to 6000 degree/min in a conventional blasting chamber.

The explosion temperature of the composition T/RDX 60/70 amounts to (depending on the calculation method) 3500 to 4000K, and after the explosion the products are cooled down to 350K.

If we take the rate of cooling of the order of 7000 degree/min, then under these conditions a carbon phase will be formed containing 70 to 80% by mass-of-the cubic phase (diamond). But for realizing such cooling conditions, it is required that the volume of the blasting chamber exceed about one million times the volume of the exposive charge. In other words, in blasting a charge of 1 kg of explosive of the composition T/RDX 60/40 a blasting chamber of about 500 m$^3$ is required, which is economically and technically inexpedient because of a high level of the product loss and low output.

If, on the contrary, the cooling rate is decreased below 200 degree/min, then due to interaction with carbon dioxide and water vapors the product of the claimed invention has time to react with them, thus turning completely to CO.

It is, therefore, necessary to provide a cooling rate which would be technically realizable and make possible to obtain the required relation between the carbon phases and a definite composition of the surface groups. All this permitted of using the material formed as a component of highly effective composite materials.

The rate of gas cooling was adjusted by using different conditions of release of gases and varying the volumes of explosives and blasting chamber.

EXAMPLE

As an initial step, in order to create the required atmosphere of gaseous explosion products for preserving the diamond-carbon material a charge of a 0.65-kg explosive is blasted, comprising trinitrotoluene and RDX in the ratio 60/40, in a blasting chamber of 3 m$^3$ volume. Then, similar charge of the explosive is blasted in the chamber. After the detonation products have expanded and a thermal equilibrium established, the gas mixture is allowed to outflow from the chamber through a supersonic flow laval nozzle with a 15-mm section for 40 s. Owing to the heat transfer to the chamber wall and the work performed by the gas, the rate of the mixture cooling becomes 304 degree/min. The condensed products formed are entrapped in cyclones and analyzed without any auxiliary cleaning.

In analyzing the powder, the following data are obtained.

black-color powder has the following elemental composition: 83.9% carbon, 1.1% hydrogen, 8.1% oxygen, 3.3% nitrogen. The content of incombustible impurities constitutes 3.5%.

From the data of X-ray studies, the product consists of three phases: 50% carbon of a cubic modification (diamond), 20% roentgen-amorphous carbon, and 30% crystalline carbon.

The composition of the surface oxygen-containing functional groups is determined polarographically. Carboxyl, quinone, lactone, ether and aldehyde groups are identified by the value of the reduction potentials. Methyl groups are identified by the composition of the gases evolved in heating (by methane evolution).

Other examples of carrying out the process with the claimed range of the method are presented in Table 1. The Table also includes comparative example with the method conditions different from those of the claimed invention for a graphic correlation with the properties of the products produced.

TABLE 1

| cooling rate degree/min | analysis results |
|---|---|
| 7 000 (comparative example with a cooling rate exceeding the maximum) | output: % - 8.0<br>elemental composition:<br>[C] - 86.5<br>[H] - 0.3<br>[N] - 4.0<br>[O] - 2.2<br>incombustible impurities - 7.0<br>phase composition:<br>carbon of cubical modification - 70<br>crystalline carbon - 10<br>composition of surface groups:<br>methyl, carboxyl |
| 6 000 (comparative example with a maximum cooling rate) | output - 7.8<br>elemental composition:<br>[C] - 85.1<br>[H] - 1.1<br>[O] - 6.0<br>[N] - 3.8<br>incombustible impurities - 4.0<br>phase composition:<br>carbon of cubic modification - 55<br>roentgen-amorphous carbon - 15<br>crystalline carbon - 30<br>composition of surface groups:<br>methyl, carboxyl, quinone, lactone, ether, aldehyde |
| 3 000 | output - 7.2<br>elemental composition:<br>[C] - 84.2<br>[H] - 0.9<br>[O] - 8.3<br>[N] - 3.1<br>incombustible impurities - 3.5<br>phase composition:<br>carbon of cubic modification - 45<br>roentgen-amorphous carbon - 15<br>crystalline carbon - 40<br>composition of surface groups:<br>methyl, carboxyl, quinone, lactone, ether, aldehyde |
| 304 | output - 4.2<br>elemental composition:<br>[C] - 83.9<br>[H] - 1.1<br>[O] - 8.1<br>[N] - 3.3<br>incombustible impurities - 3.5<br>phase composition:<br>carbon of cubic modification - 35<br>roentgen-amorphous carbon - 15<br>crystalline carbon - 50<br>composition of surface groups:<br>methyl, carboxyl, quinone, lactone, ether, aldehyde |
| 200 (comparative example with a minimum cooling rate) | output - 3.3<br>elemental composition:<br>[C] - 88.9<br>[H] - 1.0<br>[O] - 3.5<br>[N] - 3.6<br>incombustible impurities - 3.0<br>phase composition:<br>carbon of cubic modification - 30<br>roentgen-amorphous carbon - 15<br>crystalline carbon - 55<br>composition of surface groups:<br>methyl, carboxyl, quinone, ether, lactone, aldehyde |
| 100 (comparative example with a cooling rate less than the minimum) | output - 0.8<br>elemental composition:<br>[C] - 75.0<br>[H] - 1.3<br>[O] - 10.4<br>[N] - 2.6<br>incombustible impurities - 10.7<br>phase composition:<br>carbon of cubic modification - 5<br>roentgen-amorphous carbon - 45<br>crystalline carbon - 50<br>composition of surface groups:<br>carboxyl and aldehyde |
| 60 (comparative example with a cooling rate less than the minimum) | condensed phase is not observed |

The diamond-carbon material of the present invention is suggested for use as a component of composite materials as an additive enhancing the physical, mechanical and performance characteristics of rubber. Thus, for instance, when adding 1 to 3% of the material according to the invention into high-compounded rubbers, attrition resistance increase 1.2 to 1.4 times, and with low-compounded rubbers it increases 2 . . . 5 times. The rest of the quality indexes remain invariable. Bench tests carried out with a pilot batch of commercial-rubber articles have shown that components made from high-compounded rubber, such as bushings, silentblocks and the like, withstand 1.3 . . . 2.0 the rated life, and tires withstand 1.3 the rated life.

Addition of the material of the present invention into lubricating oils in an amount of 0.1% brings about the following variations.

Tribiligic wearing tests of a roller of 60KhVGS steel in friction with a block of BrOf-0.15 bronze have shown that the oil temperature decreases by 50 degrees, and the friction coefficient decreases from 0.6 to 0.15 (from other data 1.5 to 1.8 times), which increases the time of wear of friction pair 2 to 10 times and allows an increase of a load on the friction unit 1.5 to 7 times. Adding the material of the invention into 1CO-type oil in an amount of 0.1% causes one-tenth reduction of the friction coefficient.

Commercial tests have given the results as follows: the saving of lubricating oils in the diesel engines of motor vehicles has reached 25%, and fuel consumption has been reduced by 8%. The use thereof in carburator engines of motor vehicles reduces the consumption of fuel by 2 to 3% and the time of the engine running-in is reduced by one half to one third.

Adding the material of the present invention into polytetrafluorine ethylene (PTFE) has materially increased the performance characteristics of the material as seen from Table II.

TABLE II

| material | modulus of elasticity in compression | friction coefficient | comparative wear resistance |
|---|---|---|---|
| PTFE (polytetrafluorine ethylene) | 4.2 +− 0.1 | 0.21 | 1 |
| PTFE + 20% coke (F4K20) | 12.2 +− 0.5 | 0.32 | 25 |
| PTFE + 5% material of the invention | 4.9 + 20.2 | 0.21 | 68 |

Commercial tests of a sliding support of articles in radio engineering industry and seal rings of a compressor rod have shown high performance characteristics of the composite materials.

We claim:

1. In a diamond-bearing material comprising carbon, hydrogen, nitrogen and oxygen, the improvement wherein the material comprises, % by mass:

| carbon of cubic crystal structure | 30 to 75 |
|---|---|
| amorphous phase of carbon | 10 to 15 | carbon of a non-diamond crystalline phase the balance, with a quantitative ratio of elements, % by mass:

| carbon | 84 to 89 |
|---|---|
| hydrogen | 0.3 to 1.1 |
| nitrogen | 3.1 to 4.3 |
| oxygen | 2.0 to 7.1 |
| incombustible impurities | 2.0 to 5.0 | the crystalline carbon phase having a surface containing methyl, carboxyl, quinone, lactone, ether, and aldehyde functional groups, the material having a unit surface of about 218 to 600 m$^2$/g.

2. A diamond-bearing material of claim 1 prepared by a process comprising detonating, in a closed space and in an atmosphere containing gases inert to carbon, a charge consisting essentially of a carbon-containing explosive having a negative oxygen balance to form a detonation product, and cooling the detonation product at a rate of about 200 to 6,000 degrees/minute.

3. A diamond-bearing material as claimed in claim 1 wherein the material has a specific weight in a range of from about 2.2 to 2.8 g/cm$^3$.

4. A diamond-bearing material as claimed in claim 3, wherein the predominant functional group is the methyl functional group, said methyl functional group being present in sufficient quantity to impart a water-repellent property to the material.

5. A diamond-bearing material as claimed in claim 4 wherein the material comprises material particles having a size distribution, as measured by small-angle scattering, characterized by a single maximum in a region between 40 and 50 A.

6. A composite comprising the diamond-bearing material of claim 1 and a lubricating oil, said diamond-bearing material being present in the composite in an amount sufficient to reduce the friction coefficient of the oil.

7. A composite comprising the diamond-bearing material of claim 1 and polytetrafluoroethene, said material being present in the composite in an amount sufficient to increase wear resistance of the polytetrafluoroethene.

8. A composite comprising the diamond-bearing material of claim 4 and rubber, said material being present in the composite in an amount sufficient to increase attrition resistance of the rubber.

9. A diamond-bearing material as claimed in claim 1 comprising a particle structure wherein the carbon of cubic crystal structure forms a diamond nucleus that is surrounded by the amorphous phase of carbon, said amorphous phase of carbon being disposed between the carbon of non-diamond crystalline phase and the diamond nucleus.

10. A diamond-bearing material as claimed in claim 9, wherein said particle structure comprises diamond and non-diamond phases which are integrated such that they cannot be separated with both of the phases intact.

11. A method for producing a diamond-bearing material comprising the steps of detonating, in a closed space and in an atmosphere containing gases inert to carbon, a charge consisting essentially of a carbon-containing explosive having a negative oxygen balance to form a detonation product, and cooling the detonation product at a rate of about 200 to 6,000 degrees/minute, said atmosphere consisting of a gaseous medium, formed by blasting an initial charge of the explosive in the closed space prior to the detonating step, that enables the detonation product to be formed comprising carbon of a cubic crystal structure, an amorphous phase of carbon and carbon of a non-diamond crystalline phase.

* * * * *